United States Patent
Schoenberg et al.

(10) Patent No.: US 10,390,501 B1
(45) Date of Patent: Aug. 27, 2019

(54) SPRINKLER CONTROL SYSTEM

(71) Applicant: TechnologyWest, LLC, Sandy, UT (US)

(72) Inventors: Aaron G. Schoenberg, Sandy, UT (US); Alexander S. Whitelock, West Jordan, UT (US)

(73) Assignee: Technology West, LLC, Sandy, UT (US)

( * ) Notice: Subject to any disclaimer, the term of this patent is extended or adjusted under 35 U.S.C. 154(b) by 6 days.

(21) Appl. No.: 15/479,237

(22) Filed: Apr. 4, 2017

(51) Int. Cl.
*A01G 25/16* (2006.01)
*G05B 19/04* (2006.01)
*G05B 19/042* (2006.01)

(52) U.S. Cl.
CPC ......... *A01G 25/16* (2013.01); *G05B 19/0426* (2013.01)

(58) Field of Classification Search
CPC ........ G05B 2219/2625; G05B 19/0426; A01G 25/16

USPC .................................................... 700/20, 284
See application file for complete search history.

(56) References Cited

U.S. PATENT DOCUMENTS

| 6,895,987 | B2 * | 5/2005 | Addink | A01G 25/16 137/78.3 |
| 2012/0095604 | A1 * | 4/2012 | Alexanian | A01G 25/16 700/284 |
| 2014/0039697 | A1 * | 2/2014 | Weiler | A01G 25/16 700/284 |
| 2014/0148959 | A1 | 5/2014 | Levine et al. | |
| 2016/0198645 | A1 * | 7/2016 | Weatherill | A01G 25/16 700/284 |

* cited by examiner

*Primary Examiner* — Michael J Brown
(74) *Attorney, Agent, or Firm* — Brian C. Trask

(57) ABSTRACT

A controller including Wi-Fi connectivity to the internet and adapted as an add-on over-riding controller for a controller of electric sprinkler valves. The over-riding controller provides local intelligence to optionally prevent an electrical output of the sprinkler controller from actuating a sprinkler valve if one or more parameter is exceeded.

16 Claims, 3 Drawing Sheets

SPRINKLER CONTROL SYSTEM

BACKGROUND

Field of the Invention

This invention relates generally to electrically actuated control systems. It is particularly directed to a system and apparatus to control irrigation.

State of the Art

Electrically operated sprinkler timer/controllers have long been used to cause irrigation of commercial and residential property according to a predetermined watering schedule. A representative such sprinkler controller includes a clock and a switch operated by the clock to energize the control solenoid of one or more remote electrically-activated sprinkler valve during a desired watering interval. A conventional watering schedule causes a sprinkler to run during the desired watering interval on each of a set number of days of a week. Use of such sprinkler controllers is wide spread, and may even be regarded as ubiquitous. However, a rigorous adherence to a pre-programmed watering schedule often leads to over-watering, wasting a precious resource.

Some sprinkler controllers include circuitry to communicate to a local rain sensor for purpose of interrupting the pre-programmed watering schedule in the event that a sufficient amount of rain falls at the sensor location. However, accuracy of local rain sensors can be problematic. Also, an interrupt generated by a rain sensor fails to interrupt a watering schedule for alternative reasons, such as during high wind. Nor does an interrupt generated by a rain sensor adjust the length of a watering interval in accordance with changes in temperature during the watering season.

Sprinkler controllers having on-board Wi-Fi access to the internet for purpose of downloading parameters for a watering program are commercially available. One such device is sold in stores such as Home Depot under the name Rainmachine HD-12. According to its sales literature, it is a 12 zone smart Wi-Fi sprinkler controller that uses weather forecasts and weather station data to dynamically adjust watering levels for lawn and garden. It claims to increase watering efficiency by gathering and processing weather information for a consumer's area, up to several days ahead of time. Rainmachine directly connects to National and International weather data sources and adjusts daily watering amounts. A consumer is not tethered to any cloud service third party providers to use it. However, the device is expensive with a regular retail price of $239.00 at the time of this writing.

A sprinkler controller is disclosed in United States patent application Serial No. 2014/0148959 to Levine et al., hereinafter Levine. In FIGS. 5 and 6, Levine discloses a Wemo switch powered by the same 120 volt source that is used to power a controller of a sprinkler pump. The Wemo switch is illustrated as being disposed in-circuit to interrupt power flow in the hot wire between the controller and the pump. A preferred embodiment is disclosed (e.g. paragraph [18]), that interrupts power to the sprinkler controller timer and/or solenoids for a selected number of days when watering is not needed. The sprinkler controller is programmed to run the pump every day, and the Wemo switch is used to interrupt the pump operation when watering is not needed. Control instructions are transmitted from a remote site to an electronic module and then wirelessly to the sprinkler system (wirelessly to the Wemo switch). No local intelligence is required at the sprinkler controller site, and operation of the sprinklers is subject to a paid subscription to a central service.

It would be an improvement to provide a locally intelligent sprinkler controller that can be added as a low-cost retrofit to an existing ubiquitous sprinkler controller, and thereby add Wi-Fi communication capability and permit local intelligence to acquire local weather data for modifying, delaying, or skipping certain operation of the basic program stored in the sprinkler controller.

BRIEF SUMMARY OF THE INVENTION

This invention provides a low-cost retrofit to an existing ubiquitous sprinkler controller that permits automatic adjustment to a watering schedule to account for local weather, including one or more of forecast rainfall, temperature, and wind speed, among other parameters. The invention may be embodied as an apparatus including a housing containing a Wi-Fi enabled microcontroller and a relay switch disposed in the housing. The relay switch is disposed in operable communication with the microcontroller. The microcontroller provides local artificial intelligence to decide if watering (or irrigation) should occur on a given day. A pair of wires extends from the housing to receive operational power for the microcontroller from a commercially available sprinkler controller. A first control wire extends from the housing to connect to the sprinkler controller for purpose of modifying an output of the sprinkler controller, electrical communication through the first control wire being interruptible by the relay switch.

In one embodiment, a device according to certain principles of the invention may include an electrical common connector associated with the housing and structured to couple with a common wire from a sprinkler valve, the common connector being in selectable electrical communication through the relay switch with the first control wire. In another embodiment, a device according to certain principles of the invention may include a second control wire extending from the housing to connect to the sprinkler controller for purpose of modifying an output of the sprinkler controller, electrical communication through the first control wire and second control wire being interruptible by the relay switch.

The apparatus also includes means to communicate information from the world wide web to the microcontroller to provide information upon which the decision made by the microcontroller (to water or not to water), may be based. Desirably, the microcontroller is programmable to operate the relay switch and thereby interrupt any valve-operating electrical output from the sprinkler controller caused by a watering schedule of the sprinkler controller.

Certain operation of the relay switch by the microcontroller may be based upon information received by the microcontroller from the world wide web and applied to user-defined or pre-programmed parameters. Certain operation of the relay switch to over-ride an electrical output from the sprinkler controller by the microcontroller may be based upon information received from user input. In contrast to a parameter or command imposed by a central or cloud server based upon radar information for a large geographic area, the decision made by the microcontroller, to allow a watering event or to interrupt a watering event that is programmed by the sprinkler controller, is arrived at locally by the microcontroller using data communicated, from local weather stations, over the world wide web to the microcontroller.

Sometimes, the relay switch is a solid-state relay switch. In certain embodiments, the relay switch is normally open. Certain operation of the relay switch by the microcontroller may be based upon a user over-ride command input through hardware associated with the housing or by way of Wi-Fi and the hand-held device.

A system according to certain principles of the invention may include software operable on a hand-held device to communicate set-up and operational parameters to the microcontroller, as required. Desirably, the microcontroller is structured to communicate wirelessly to the hand-held device. Further, the means to communicate information from the world wide web to the microcontroller is desirably wireless, but may be wired, and/or include a wired component in the communication path.

The invention may be embodied as an apparatus including a housing containing a Wi-Fi enabled microcontroller to communicate information from the world wide web to the microcontroller and a solid state, normally-open relay switch carried by the housing and in operable communication with the microcontroller. The device may further include a pigtail extending from the housing and having a first lead and a second lead to receive operational power from a commercially available sprinkler controller and to communicate the operational power to the microcontroller.

An exemplary such device also provides a first control wire extending from the housing to the sprinkler controller to modify an irrigation control output of the sprinkler controller. One operable device may include an electrical common connector associated with the housing and structured to couple with a common wire from a sprinkler valve, the common connector being in selectable electrical communication, through the relay switch, with the first control wire. In that case, the first control wire may constitute a common, or ground, wire connected to a common, or ground, connector of the sprinkler controller. An alternative operable device may include a second control wire extending from the housing to connect to the sprinkler controller for purpose of modifying an output of the sprinkler controller by way of a rain sensor input of the sprinkler controller. In that case, the first control wire and second control wire may constitute a continuity input to replace a rain sensor, or a jumper, which may be connected to a rain sensor input of the sprinkler controller. Further, electrical communication through the first control wire and second control wire is interruptible by the relay switch.

Typically, the microcontroller is programmable to operate the solid state relay switch as desired to interrupt electrical communication along the first control wire and thereby prevent the sprinkler controller from opening a sprinkler valve that is connected to the sprinkler controller. In preferred embodiments, the microcontroller is programmed, to make a local decision to allow watering or to interrupt a watering event that is programmed by the sprinkler controller, based upon information parsed by the microcontroller from local weather stations and communicated over the world wide web to the microcontroller.

BRIEF DESCRIPTION OF THE DRAWINGS

In the drawings, which illustrate what are currently considered to be the best modes for carrying out the invention.

DETAILED DESCRIPTION OF THE ILLUSTRATED EMBODIMENT(S)

Reference will now be made to the drawings in which the various elements of the illustrated embodiments will be given numerical designations and in which the invention will be discussed so as to enable one skilled in the art to make and use the invention. It is to be understood that the following description is only exemplary of certain principles of the present invention, and should not be viewed as narrowing the claims which follow.

Figure 1:
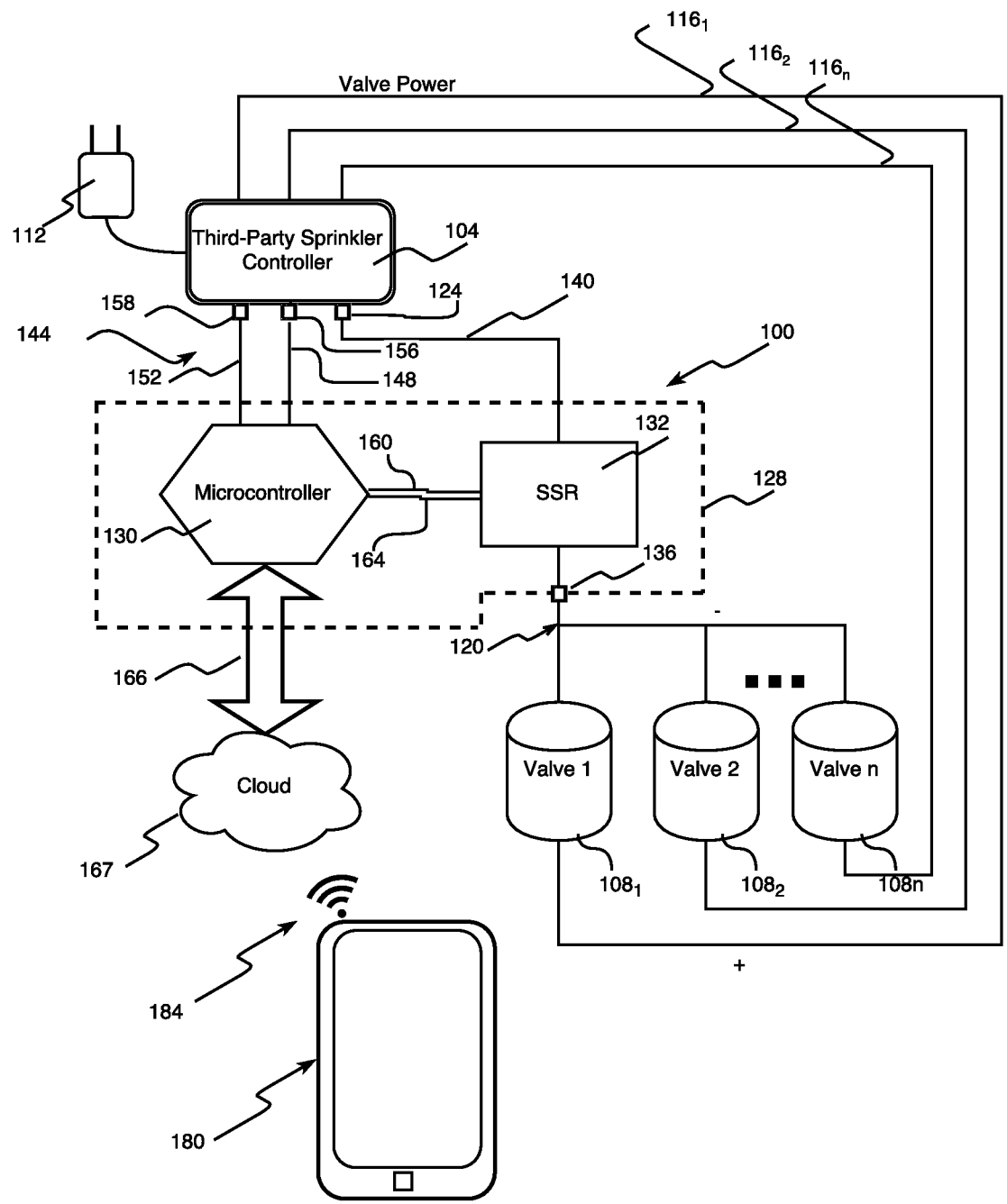
FIG. 1 is a schematic illustrating connection of a device according to certain principles of the invention interconnected with a sprinkling system and timer/controller.

FIG. 1 illustrates an embodiment according to certain principles of the invention, generally indicated at 100, interconnected with a conventional sprinkler controller 104 and a plurality of sprinkler valves $108_i$. Controller 104 typically receives 120 volt electrical power by plugging the plug 112 into a conventional electric outlet, or may sometimes be hard wired. In any case, an electric power supply is typically connected to the sprinkler controller 104, which is structured to output electrical power at desired voltages for use by devices, such as a pump or relay for a pump, or to operate a solenoid of one or more sprinkler valve. Controller 104 typically includes an internal timer, and is programmable to turn on, and off, electrically-activated sprinkler valves according to a user-input programmed watering schedule.

Conventionally, controller 104 provides power to electrically-activated sprinkler valves $108_i$ through corresponding individual power lines $116_i$. Typically, a plurality of sprinkler valves $108_i$ share a single ground (or common line 120). The common line 120 would conventionally be connected to a common connector 124 at the controller 104. In some instances, more than one common line 120 may be connected to the controller 104 (e.g., in the case where sprinkler valves are disposed at different locations—in which case a common wire 120 is conventionally included in the wire bundle from each location). All of the common line(s) are electrically at the same potential, and for simplicity, will generally be made reference to in this document as a single common line.

Embodiment 100 includes a housing 128, which holds a Wi-Fi enabled microcontroller 130 and a solid-state relay switch 132. A workable microcontroller 130 is embodied in the TI CC3200, which is documented at word wide web ti.com/product/CC3200/datasheet. Housing 128 carries an external common connector 136 for connection of the common line 120 extending from sprinkler valves $108_i$. Housing 128 also provides a grounding pigtail wire 140, for connection of pigtail or common line 140 to a common connector 124 at the controller 104. The solid-state relay switch 132 is disposed to interrupt electrical communication between the common line 120 and the common line 140, thereby interrupting any watering command output by the controller 104.

Housing 128 also provides a power pigtail, generally indicated at 144, for communicating operational electric power from the sprinkler controller 104 to the microprocessor 130. Power pigtail 144 includes a first wire 148 and a second wire 152. Wires 148, 152 are connected to corresponding power-out terminals 156 and 158, respectively, of the sprinkler controller 104. Power output terminals 156, 158 typically provide electricity at a reduced voltage (e.g., 24 volts AC) compared to the voltage input from a plug 112 (e.g., 120 volts).

The microcontroller 130 is programmed to provide an electric signal through internal conductors 160 and 164 to the relay switch 132 effective to permit, delay, or skip, an electrical sprinkler control signal that is output by controller 104 in accordance with the irrigation program established in the sprinkler controller 104. Microcontroller 130 can communicate wirelessly, as indicated by double-ended arrow 166, to the world wide web 167, to obtain and parse local weather forecasts and permit artificial intelligence of the microcontroller to make a local determination as to water, or not water.

Figure 2:
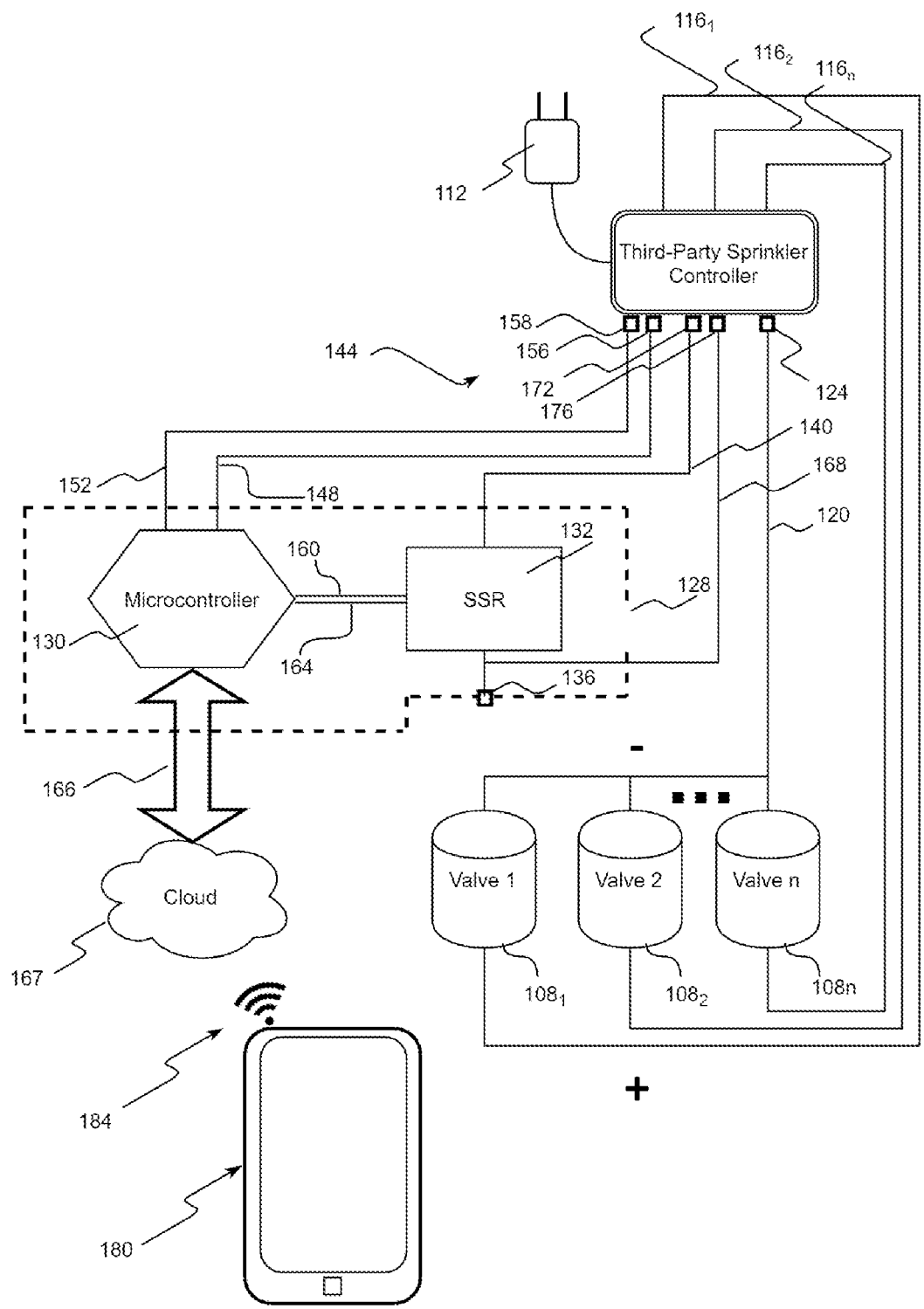
FIG. 2 is a schematic illustrating an alternative workable control connection.

In the embodiment of FIG. 1, the switch 132 is disposed to optionally interrupt electrical communication between controller 104 and any number of sprinkler valves along the common line 120. In the embodiment of FIG. 2, the switch 132 is disposed to optionally interrupt electrical continuity through control line 140 and control line 168. In the latter case, control line 140 and control line 168 are connected at sprinkler controller 104 to the rain sensor terminals 172 and 176, respectively, and presence of common connector 136 at housing 128 is optional. The control functionality provided by the embodiment in housing 128 is identical, in either case. It is also within contemplation that the proximal end of control line 168 may alternatively be connected to the common connector 136, rather than the internal connection illustrated in FIG. 2.

A control device 100 will typically be introduced and coupled to a consumer's Wi-Fi network through software, or an App, running on a Wi-Fi enabled hand-held device 180 (like a cell phone, PDA, tablet, laptop, and the like). This hand-held interface device 180 desirably is a cell phone, as it will allow much easier setup for commercial applications, where a computer is not available, as well as some people (albeit not many) do not keep a home computer especially with the advent of large screen cell phones. Desirably, this App will also be native, written in IOS, Android and Windows. This allows the use of features built into phone operating systems and languages to establish connections. Control device 100 may also have an LED indicating proper function. In such case, a consumer may use their cell phone to set it up, and it will only require one trip (to e.g., the back corner of the garage), to know it is set up and functioning. For this same reason (sprinkler controller location) communication between cell phone (or other hand-held device 180) and sprinkler controller 100 is desirably by way of a wireless signal 184.

The App will interface with a device 100 allowing a consumer to add their network SSID and password to the device 100. It will also allow an easy one click watering delay for home events (weddings, intense croquet competition, etc.). Adjustability may be allowed to the consumer as to the amount of rain, temperature or wind required to generate automatic delays, and it is contemplated that this may be built into the device 100 and determined geographically. Any of the aforementioned adjustability may be handled on a device management page in the App.

In one exemplary use, the customer will bring a device 100 home, attach pigtail 144 to their sprinkler controller's positive and negative 24 VAC, attach their existing common wire 120 to terminal 136 of device 100, attach the common wire 140 from device 100 to the common connector 124 of the controller 104, then open the App and be greeted by a device set up screen. This screen will typically include two text Fields; one for their SSID, and one for their password. After entering this information they may be given a device connection conformation and a tutorial on the features of the device management page which can allow adjustment as to amount of rain, temperature, or wind for automatic delays. The device management page may allow management of multiple devices, since large residential and commercial properties commonly have more than one sprinkler controller. Device updates can be handled as App updates as well.

Figure 3:
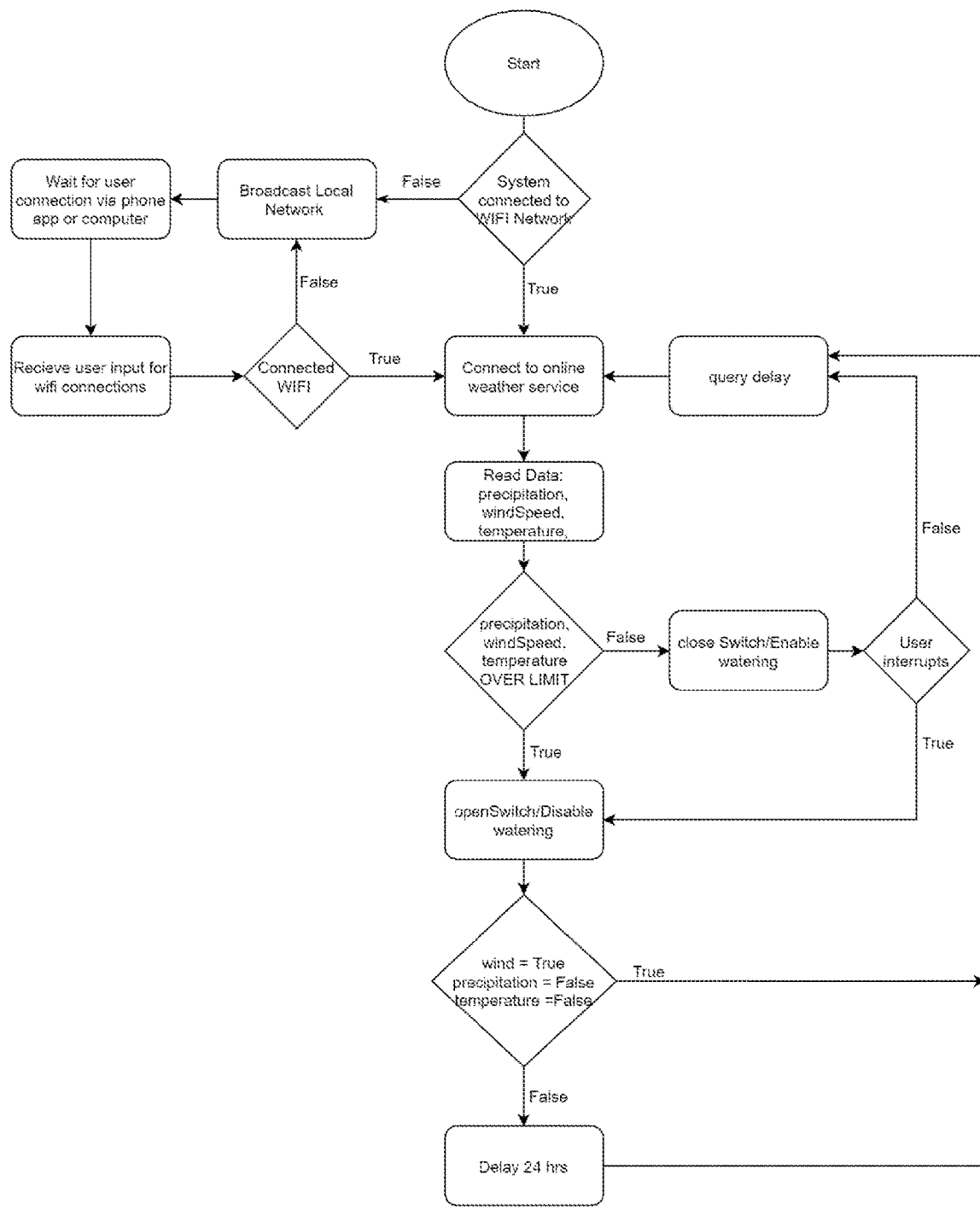
FIG. 3 is a flow chart illustrating operation of a system according to certain principles of the invention.

The consumer remains responsible for establishing a sufficient baseline watering program in their sprinkler controller 104. A device 100 may be added to their system to modify their watering program by deletion, or skipping, of unnecessary watering intervals according to artificial intelligence logic provided locally by microcontroller 130, and certain pre-determined or consumer-defined parameters. Exemplary "water" or "do not water" over-ride logic provided by a device 100 include: if more than a quarter inch of rain has been received locally in the last 24 hours—do not water. If the overnight low temperature has been less than 60 degrees for two consecutive nights, do not water. If local code prohibits watering at this time, do not water. Also if the wind speed as of a device 100's last interaction with the weather service has been over some limit (such as 30 mph), do not water. FIG. 3 presents a self-explanatory overview of a workable installation and operation scenario as a logic flowchart.

The device 100 may be characterized as an "internet of things" device that can connect to current micro-local weather data including but not limited to temperature, rainfall, current precipitation conditions, wind speed, and other relevant weather data. The device 100 will also obtain the forecasted weather data. In accordance with the flowchart of FIG. 3, a system including device 100 works by being connected to a local network. The device 100 is typically powered by the existing sprinkler controller 104. However it can also be externally powered if desired. Once the device 100 is connected to a local network, it will attempt to make a connection to servers of weather data hosting services. The device 100 typically makes use of 3rd party systems to get weather data, and is able to query various sources for this data such as https://www.wunderground.com/. If a connection is not achieved, and the system has not previously been set up by a user, then it will typically enter into 'setup' mode.

In 'setup mode', the device 100 will broadcast a short range Wi-Fi network signal that the user may use to wirelessly connect device 100 to via a mobile phone or other device with wireless capability. Once the user has connected to the device 100, the App walks the user through sending appropriate internet connection data from the device 100 to their local access point. Sending the internet connection data generally includes SSID of the network and any credentials needed for establishing a connection, as well as any other required user data, through the device 100 to the access point. Once the required data has been received by the access point, the device 100 once again attempts to connect to the internet.

After the device 100 is successfully connected to the internet, it will typically query a weather service online, reading back the previously mentioned pieces of data. When a successful packet of data (here packet means all the precipitation data, wind speed, temperature, etc.) has been received, it will be parsed, and then based on user definitions or preset conditions the device 100 will determine if it has exceeded any of the parameter limits. For example, if the data says that it is currently raining or that rainfall in the past 24 hrs has been greater than ¼", it may interrupt the common wire of the sprinkler systems valves, which prevents forming a complete electrical circuit and thus prevents the controller 104 from watering. It is important to note that the 3rd party sprinkler controller 104 is not aware of this, and it simply outputs an irrigation control signal according to the user's input program. The device 100 simply prevents watering from occurring when it is not smart to water (Smart meaning according to the data it would be wasteful because it is too cold, or already rained, or too windy and so on). It does not allow for activating the system unless the 3rd party sprinkler is already in the ON mode.

At this point there are two things that may happen: 1). In the event that watering should not occur, then the system will determine for how long to interrupt the system before it allows regular watering. It may delay for up to 24 hrs if rainfall is very high, where very high is relative to geographical location, and/or watering needs, which can be set by user as well as determined by local water conservation guidelines. In the event that the interruption was not due to excessive rainfall and was just due to high winds, then the system may only interrupt watering for a shorter amount of time checking for better conditions to begin watering.

And 2). In the event that no cause was found to interrupt the regular watering schedule: then the system will wait a short amount of time before again checking conditions over the internet. During this time, the switch 132 is closed, which means that normally scheduled watering will occur according to the irrigation program established by the user in controller 104.

However, there is a condition in which device 100 will open the switch 132, even if the environmental conditions are such that watering should be allowed, and that is by user interruption. If the user sets a day or a set of days to not water, for example by using the device App, then querying of the online services will be suspended until the user-set days have passed. During this time, the switch 132 will be opened and will prevent a sprinkler system from activating. This is useful in the event of activities outside where the user would not want interrupted by sprinklers. The control App communicates over the internet, so a user can quickly turn the sprinklers off by using the App from anywhere they have internet connectivity.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a housing containing a Wi-Fi enabled microcontroller and a relay switch disposed in the housing and in operable communication with the microcontroller;
a pair of wires extending from the housing to receive operational power for the microcontroller from a commercially available sprinkler controller;
a first control wire extending from the housing to connect to a first electrical terminal on the sprinkler controller for purpose of modifying an output of the sprinkler controller;
a second control wire extending from the housing to connect to a second electrical terminal on the sprinkler controller for purpose of modifying an output of the sprinkler controller, the first control wire and the second control wire to place the housing in-circuit with the sprinkler controller independent from electrical communication through any sprinkler valve; and
means to communicate information from the world wide web to the microcontroller to provide information upon which the decision made by the microcontroller to water or not to water may be based; wherein:
the microcontroller is programmable to operate the relay switch and thereby interrupt any valve-operating electrical output from the sprinkler controller caused by a watering schedule of the sprinkler controller, electrical communication through the first control wire and second control wire being interruptible by the relay switch responsive to a plurality of input parameters comprising forecast rainfall, temperature, and wind speed.

2. The apparatus according to claim 1, wherein:
certain operation of the relay switch by the microcontroller is based upon information received by the microcontroller from the world wide web and applied to user-defined or pre-programmed parameters.

3. The apparatus according to claim 1, wherein:
certain operation of the relay switch to over-ride an electrical output from the sprinkler controller by the microcontroller is based upon information received from user input.

4. The apparatus according to claim 1, wherein:
the relay switch is a solid-state relay switch.

5. The apparatus according to claim 1, wherein:
the relay switch is normally open.

6. The apparatus according to claim 1, further comprising:
software operable on a Wi-Fi enabled device to communicate set-up and operational parameters to the microcontroller, as required.

7. The apparatus according to claim 1, wherein:
the microcontroller is structured to communicate wirelessly to the Wi-Fi enabled device.

8. The apparatus according to claim 1, wherein:
the means to communicate information from the world wide web to the microcontroller is wireless.

9. The apparatus according to claim 1, wherein:
certain operation of the relay switch by the microcontroller may be based upon a user over-ride command input through hardware associated with the housing or by way of Wi-Fi and the Wi-Fi enabled device.

10. The apparatus according to claim 1, wherein:
in contrast to a parameter or command imposed by a central or cloud server based upon radar information for a large geographic area, the decision made by the microcontroller, to allow a watering event or to interrupt a watering event that is programmed by the sprinkler controller, is arrived at locally by the microcontroller using data communicated, from local weather stations, over the world wide web to the microcontroller.

11. The apparatus according to claim 1, further comprising:
an electrical common connector associated with the housing and structured to couple with a common wire from a sprinkler valve, the common connector being in selectable electrical communication through the relay switch with the first control wire.

12. An apparatus, comprising:
a sprinkler controller;
a housing containing a Wi-Fi enabled microcontroller to communicate information from the world wide web to the microcontroller and a solid state, normally-open relay switch carried by the housing and in operable communication with the microcontroller;

a pigtail extending from the housing and comprising a first lead and a second lead to receive operational power from the sprinkler controller and to communicate the operational power to the microcontroller;

a first control wire extending from the housing and connected to a first rain sensor terminal of the sprinkler controller to modify a control output of the sprinkler controller;

a second control wire extending from the housing and connected to a second rain sensor terminal of the sprinkler controller for purpose of modifying an output of the sprinkler controller by way of a rain sensor input of the sprinkler controller, electrical communication through the first control wire and second control wire between the housing and the sprinkler controller being interruptible by the relay switch and independent from electrical communication through any sprinkler valve; wherein:

the microcontroller is programmable to operate the solid state relay switch responsive to acquiring and evaluating a plurality of parameters comprising forecast rainfall, temperature, and wind speed to interrupt electrical communication between the first rain sensor terminal and the second rain sensor terminal and thereby prevent the sprinkler controller from opening a sprinkler valve that is connected to the sprinkler controller.

13. The apparatus according to claim 12, wherein:
the microcontroller is programmed, to allow watering or to interrupt a watering event that is programmed by the sprinkler controller, based upon information parsed by the microcontroller from local weather stations and communicated over the world wide web to the microcontroller.

14. The apparatus according to claim 12, further comprising:
an electrical common connector associated with the housing and structured to couple with a common wire from a sprinkler valve, the common connector being in selectable electrical communication, through the relay switch, with the first control wire.

15. The apparatus according to claim 12, further comprising:

software operable on a hand-held device to communicate set-up and operational parameters to the microcontroller, as required.

16. A method, comprising:
providing an intelligent add-on over-ride device to a consumer to provide enhanced sprinkler operation based upon a plurality of input parameters comprising forecast rainfall, temperature, and wind speed, the over-ride device comprising a Wi-Fi enabled microcontroller in operational association with a normally-open solid-state relay switch, a power input pigtail, a first control lead, and a second control lead, the solid-state relay switch being disposed to interrupt electrical communication along a path extending through the first control lead and the second control lead to prevent conventional electrical communication between a sprinkler timer/controller and one or more electrically controlled sprinkler valve;

providing software for download over the world wide web, the software being operable on the microcontroller and establishing operational parameters for the microcontroller;

instructing the consumer to download and install the software on a Wi-Fi enabled hand-held device;

instructing the consumer to connect first and second wires of the pigtail to cooperating power output terminals of a commercially available sprinkler controller;

instructing the consumer to connect the first control lead to a first rain sensor terminal of the sprinkler controller independent from electrical communication through any sprinkler valve;

instructing the consumer to connect the second control lead to a second rain sensor terminal of the sprinkler controller independent from electrical communication through any sprinkler valve; and instructing the consumer to operate the software to place the microcontroller in communication with the world wide web by way of a wireless access point and to establish a plurality of optional interrupt parameters.

* * * * *